United States Patent [19]
Blais et al.

[11] Patent Number: 5,396,642
[45] Date of Patent: Mar. 7, 1995

[54] VARIABLE FREQUENCY CATV JAMMING METHOD AND APPARATUS

[75] Inventors: Pierre Blais; Marc Bourdeault, both of Montreal; Mitchell J. Goldberg, Dollard D. O.; Gerard Terreault, Pierrefonds, all of Canada

[73] Assignee: Electroline Equipment Inc., Montreal, Canada

[21] Appl. No.: 929,519

[22] Filed: Aug. 14, 1992

[51] Int. Cl.⁶ ............... H04N 7/167; H04N 7/173; H04N 1/42; H04H 1/04
[52] U.S. Cl. ......................... 455/1; 455/5.1; 348/5.5; 348/12; 380/7; 380/10
[58] Field of Search ........... 380/10, 20, 7; 455/3.1, 455/1, 3.3, 4.1, 4.2, 5.1, 6.1, 6.2; 348/5.5

[56] References Cited
U.S. PATENT DOCUMENTS

| | | | |
|---|---|---|---|
| 4,081,831 | 3/1978 | Tang et al. | 380/20 |
| 4,912,760 | 3/1990 | West, Jr. et al. | 380/7 |
| 4,914,695 | 4/1990 | Martin | 455/1 |
| 5,014,309 | 5/1991 | West, Jr. | 455/1 |
| 5,142,574 | 8/1992 | West, Jr. et al. | 380/20 |
| 5,265,160 | 11/1993 | Harney et al. | 380/10 |
| 5,287,539 | 2/1994 | West, Jr. | 380/10 |

*Primary Examiner*—Edward F. Urban
*Assistant Examiner*—Mark D. Wisler
*Attorney, Agent, or Firm*—Norman B. Rainer

[57] ABSTRACT

A frequency generating means, generates an initial frequency of greater amplitude than the amplitude of a television signal carrier wave. The generated frequency is compared to a reference frequency which would be suitable for jamming one of the channels to be jammed. If the generated frequency is too high or too low, the frequency generating means generates a new frequency which is, respectively, either lower or higher than the initial frequency it generated. If the new generated frequency is still higher or lower than the reference frequency, the frequency generating means generates another new frequency, which is respectively, either lower or higher than the previously generated frequency, but by a lesser amount than the amount by which the previously generated frequency differed from the frequency generated before it. The generation of new frequencies continues until one of them is within a desired range of the reference frequency, at which time the generated frequency is stored in memory. The same procedure is used to obtain memorized frequencies to be generated by the frequency generating means for jamming each channel to be controlled. On a time divisional basis the frequency generating means generates the jamming frequencies which are transmitted to each of the subscribers who are not entitled to receive the channel they are jamming. Periodically the jamming of channels is briefly stopped and the jamming frequencies are re-calculated and re-memorized, then the calculation process stops and the jamming resumes.

27 Claims, 6 Drawing Sheets

VARIABLE FREQUENCY CATV JAMMING METHOD AND APPARATUS

BACKGROUND OF THE INVENTION

1. Field of the Invention:

The invention relates to CATV systems, and more particularly to a method and apparatus for selectively jamming selected channels to selected subscribers in a CATV system.

2. Description of Related Art:

CATV systems commonly provide a multiple of channels to their subscribers; such systems are well known in the art and have been for many years. Many CATV systems, however, do not require each of their subscribers to subscribe to every one of the channels they offer. The result is that an effective method, and apparatus to carry out that method, is needed to allow a CATV system to provide different numbers of channels to different subscribers, and at the same time retain the ability to provide up to all of their channels to up to all of their subscribers. It is even more desirable for a CATV system to be able to easily change the number of channels it is providing to any, of its subscribers, at any time, and from time to time. That is generally desirable because most CATV systems charge different amounts to their various subscribers, depending on how many of the supplied channels the particular subscriber wants to receive, and those features allow a subscriber to easily change the number of channels he receives. The result is that with those features a CATV system can easily sell additional channels to its subscribers, or stop sending channels to subscribers who do not want them or are not paying for them.

Scrambling and de-scrambling systems have been developed and are used by some CATV systems to control which channels a particular subscriber receives. Certain channels are scrambled prior to transmission from the supplier's head end, and subsequently de-scrambled at the home ends of those subscribers who have paid for those scrambled channels. A device commonly referred to as a de-scrambler is installed in the paying subscribers homes, which restores the scrambled television signal. Those systems require access to the subscriber's home, and man power to do the installation, or to remove the de-scrambler in the event the subscriber no longer wants it, or has stopped paying the fee. Those systems also run the risk of channels being pirated by subscribers who have built, or purchased, their own illegal de-scrambler.

Another known means of controlling subscriber access to the total channels in a CATV system is to selectively jam the channels to be denied to the subscribers who have not paid for them. The jamming of channels is usually accomplished by sending a separate jamming signal for each of the channels to be jammed, together with the television signals, to the subscriber(s) for whom those channels are to be jammed. Each jamming signal can be a signal having a repetition rate close to the repetition rate of the vertical synchronization signal of the channel to be jammed, and of a greater amplitude. The television will pick up the jamming signal as the synchronization signal and will therefore produce a vertically unstable picture. Similarly, the jamming signal can be a signal having a repetition rate close to the repetition rate of the horizontal synchronization signal of the channel to be jammed, and of a greater amplitude. The television will then pick up the jamming signal as the horizontal synchronization signal and will therefore produce a horizontally unstable picture.

A device is required that will not only produce the required jamming signals, but also, will only combine the jamming signals with the television channel signals going to the subscriber(s) who have not paid for those channel.

Some of the earlier prior art has used one separate line per subscriber, and one RF switch per subscriber, per channel that might be jammed. The separate subscriber lines are each coupled to a different RF switch for each channel that might be jammed, thereby creating a switch and subscriber line matrix in which each subscriber line has a unique RF switch for each channel that might be jammed, controlling that subscriber's access to said channel, and in which all RF switches controlling subscriber access to a particular channel are connected to each other. For example only, if the situation is that channel "C" is to be jammed to subscribers "101", "222", and "223", each of the channel "C" RF switches that couple the jamming signal to those subscriber lines must be closed. Accordingly, if there are 2500 subscribers and 4 channels to be jammed, 2500 separate subscriber lines are needed, and $(4 \times 2500) = 10,000$ RF switches are required. Accordingly, a large number of RF switches are required. In such a system it would be difficult to add further subscriber lines and switches to the switch and subscriber line matrix.

Some of the more recent prior art use apparatuses that are capable of generating up to a fixed number of different jamming signals, (for example the maximum might be 6) sometimes continuously, and sometimes on a time divisional basis. In some of the more sophisticated present art systems the jamming signals are added on a time shared bases to the subscribers lines who are not permitted to view the particular channel being jammed. In many of the more sophisticated prior art systems that add jamming signals to subscriber lines on a time divisional basis the maximum number of jamming signals that can be generated is eight or less. Therefore, the maximum number of channels that can be jammed is eight or less. That is obviously a problem for a CATV system that wants to offer nine or more alternative channels.

A number of difficulties have to be overcome when jamming signals are not continuously added to the appropriate subscriber lines. However, the benefits of adding jamming signals to the appropriate subscriber lines on a time divisional basis are great. Therefore it is worth the effort of trying to overcome the difficulties involved in time divisional jamming. A major benefit to time divisional jamming is that only one line can be used to carry all of the different jamming signals to one subscriber. Only one line has to be used, because when the jamming signal being transmitted is to jam a channel the subscriber is not entitled to receive, then the RF switch to that subscriber's single jamming signal line is closed, hence the subscriber receives the jamming signal, and that channel is jammed on the subscriber's television set. However, when the jamming signal being transmitted is to jam a channel the subscriber is entitled to receive, then the RF switch to that subscriber's single jamming signal line is left open, hence the subscriber does not receives the jamming signal, and that channel is not jammed on the subscriber's television set. The result is that the channel is jammed during the time its jamming signal is being transmitted, but not during the time it's jamming signal is not being transmitted. Therefore, if the time between transmissions of the same jamming signal is too great, the channel will only be jammed sometimes, hence it would be partly viewable. It should therefore be a goal of time divisional jamming systems to reduce the time between transmissions of the same jamming signal so that the channel is humanly unviewable.

It is more desirable to produce a horizontally unstable picture than a vertically unstable picture, as the former is more difficult to watch. To produce a horizontally unstable picture the jamming signal must be sent to each subscriber who is to be jammed by it many thousands of times per second, thereby effectively always jamming the television signal. To accomplish transmitting different jamming signals on the same line many thousands of times per second, rapid switching is required; rapid or continuous generation of the jamming signals is also required, and finally, the rapid switching and the jamming signals must be combined correctly to the appropriate subscribers. Those skilled in the art will perceive many problems in rapidly switching between frequencies and maintaining accuracy of frequency within a small range.

Some of the more sophisticated prior art systems have used fixed inductive circuits which are alternately coupled with an oscillator to generate different frequencies through that oscillator. Some of the other more sophisticated prior art systems have used a voltage controlled oscillator to generate the different jamming frequencies on a time divisional basis. The goals in the prior art have generally been to effectively jam the largest number of channels with the least amount of expensive components, while at the same time allowing for control of what channels are jammed to which subscribers, from the head end, with a minimum of equipment malfunction. The goals of the present invention are the same as the stated generally accepted goals in the prior art. The present invention accomplishes those goals in a new and effective way not contemplated by the prior art, and for a greater number of channels than the prior art inventions of which the Inventors of the present invention are aware.

SUMMARY OF THE INVENTION

The invention teaches a method for controlling the reception quality of individual subscribers to CATV, and is comprised of the following steps. First, selecting and generating a Reference Frequency ("RFz") for each of the channel "z" to be jammed, wherein each RFz is a suitable frequency for jamming channel z. Second, sending an initial Frequency Generation Signal ("FGSa") to a generating means, which causes the generating means to generate a Jamming Frequency ("JFa") that is similar to the carrier wave frequency of a typical television channel's signal, and of a slightly greater amplitude. Third, comparing JFa to RFz, and if JFa is higher or lower than RFz, sending a different FGSa, which is either lower in voltage or higher in voltage, respectively, than the previous FGSa, by an initial amount, to the generating means, causing it to generate a new JFa. Then again comparing the generated JFa with RFz, and if JFa is higher or lower than RFz, sending a new FGSa, which is either lower in voltage or higher in voltage, respectively, than the previous FGSa, by less than the previous amount, to the generating means, causing it to generate a new JFa, which is again compared to RFz, until the last increase or decrease in the voltage of FGSa resulted in a frequency change in JFa of <I, {where "I" is a frequency value such that RFz+I would jam the television signal for which RFz is a reference frequency, if the amplitude of RFz+I was within the correct parameters}. Fourth, storing the last FGSa, as FGSz, where FGSz is the FGSa that causes the generating means to generate a JFa that will jam channel z. The JFa that will jam channel z is called JFz. Fifth, continuing the second, third and fourth steps until there is a stored FGSz for each channel z, and then suspending the second, third and fourth steps. Sixth, in continuous rotation, each for durations suitable for jamming the horizontal synchronization signal, combining JFz with the television channels signals being transmitted to subscribers who are not entitled to receive the television signal which JFz is jamming. Seventh, suspending the sixth step for a period long enough for the second, third, fourth and fifth steps to be repeated, and then resuming the sixth step.

A preferred method of determining the correct FGSz values is to reduce or increase the JFa by half of the previous amount it was reduced or increased by, (i.e. using a binary convergence method) until the change in JFa is less than I. It is also preferred to store a FGSa, as the FGSz, that resulted in JFa>RFz. Therefore it is preferred to continue the comparision of JFa to RFz until: (a) the last increase or decrease in JFa was <I, and (b) the second last increase or decrease in the JFa was <I, and (c) the second last increase or decrease in the JFa was the opposite of the last increase or decrease in JFa, and then to store as FGSz, whichever of the last and second last FGSa's resulted in JFa>RFz.

To accomplish the more desirable determination of the FGSz values, and the more desirable FGSz values the following third and fourth steps would replace the previously stated third and fourth steps. New Third Step, comparing JFa to RFz, and if JFa is higher or lower than RFz, sending a different FGSa, which is either lower in voltage or higher in voltage, respectively, than the previous FGSa, by an initial amount, to the generating means, causing it to generate a new JFa. Then again comparing the generated JFa with RFz, and if JFa is higher or lower than RFz, sending a new FGSa, which is either lower in voltage or higher in voltage, respectively, than the previous FGSa, by half of the previous amount, to the generating means, causing it to generate a new JFa, which is again compared to RFz, until: (a) the last increase or decrease in the voltage of FGSa resulted in a frequency change in JFa of <I, {where "I" is a frequency value such that RFz+I would jam the television signal for which RFz is a reference frequency, if the amplitude of RFz+I was within the correct parameters} and (b) the second last increase or decrease in the voltage of FGSa resulted in a frequency change in JFz of <I, and (c) the second last increase or decrease in the voltage of FGSa was the opposite of the last increase or decrease in FGSa. New Fourth step, storing whichever of the last and second last FGSa's resulted in JFa>RFz, as FGSz, where FGSz is the FGSa that causes the generating means to generate a JFa that will jam channel z. The JFa that will jam channel z is called JFz.

The method taught by the invention also allows the same jamming signal to be used to jam both the horizontal and the vertical synchronization signals of the channels to be jammed. To accomplish jamming both the horizontal and the vertical synchronization signals, of the channels to be jammed, the Sixth Step is divided into two steps, Six (a) and Six (b). Step Six (a) is identical to the old sixth step. In step Six (b), in continuous rotation, each for durations suitable for jamming the vertical synchronization signal, each of the JFz's is combined with the television channels signals being transmitted to subscribers who are not entitled to receive the television signal which JFz is jamming. Steps Six (a) and Six (b) are carried out, on a time shared basis, as determined by the method operator, in the period of time during which the old Sixth Step would have been carried out. The other steps of the method are performed exactly the same whether there is only a Sixth Step, or whether there is a Step Six (a) and a Step Six (b).

The invention, in addition to the stated method, also teaches an apparatus for controlling the reception quality of individual subscribers to CATV, which apparatus is comprised of the following components. A Voltage Controlled Oscillator ("VCO") for generating a frequency ("JFa") that is similar to the frequency of a typical television signal's carrier wave frequency, and having a duration similar to a typical horizontal synchronization signal's duration, and of a slightly greater amplitude. A set of Subscriber Jamming Signal Switches, each of which receives the JFa, and each of which will transmit the JFa to the line of the television set of the subscriber to which it is connected. A Reference Frequency Generating Means that generates a reference frequency ("RJFz") which is suitable for jamming channel z. A Comparision Means that receives the JFa and that receives the RJFz, and can divide the JFa by a factor of "D", where D is a factor such that if JFa is the correct frequency to jam channel z, then JFa/D=RJFz, and which comparison means can compare the RJFz to JFa/D and determine if RJFz is greater than or less than JFa/D. A service control center ("SCC") that receives information from the head end on which subscribers are entitled to receive which television signals. Additionally, the SCC outputs a Frequency Generating Signal ("FGSa") to the VCO, that determines the frequency of JFa. Additionally, the SCC, based on the information it receives from the head end as to the frequencies of the channels to be jammed, determines the value of D that the Comparison Means must divide JFa by. Additionally, the SCC sends the information of what value D should be to the Comparison Means, at the appropriate time. Additionally, to start the system the SCC begins step "Test" by sending a FGSa to the VCO, causing the VCO to generate JFa; then the SCC sends the appropriate information on the value of D, so that RJFz×D would be the appropriate frequency for jamming channel z, to the Comparison Means. The Comparison Means sends a first signal to the SCC if the comparison resulted in JFa/D>RJFz, and a second signal to the SCC if the comparison resulted in JFa/D<RJFz; if JFa is higher or lower than RJFz×D, then the SCC sends a different FGSa, which is either lower in voltage or higher in voltage, respectively, than the previous FGSa, by an initial amount, to the VCO, causing it to generate a different JFa. Then, when the SCC receives the result of the new comparison from the Comparison Means, if JFa is higher or lower than RJFz, the SCC sends a different FGSa, which is either lower in voltage or higher in voltage, respectively, than the previous FGSa, by less than the previous increase or decrease, to the VCO. The SCC again receives the results of the comparison of JFa/D to RJFz, and the SCC continues to receive the results of the comparison and to send out different FGSa's which are either increased or reduced by less than the increase or decrease of the previous FGSa was, until the last increase or decrease in the frequency of JFa was <I, {where "I" is a pre-determined, fixed, frequency value such that (RJFz×D)+I is close enough to RJFz×D, to jam the television signal of channel z if it's amplitude were high enough}, the SCC then stores the last FGSa, as FGSz, where FGSz is the FGSa that causes the generating means to generate a JFa that will jam channel z. The JFa that will jam channel z is called JFz. Additionally, the SCC continues to operate as stated until there is a stored FGSz for each of the channels to be jammed. Once all of the FGSz's have been stored step Test is ended. Additionally, the SCC then suspends the operations of step Test and begins step Jam by, where N is the number of television signals being jammed, sending, in continuous rotation, each for durations suitable for jamming the horizontal synchronization signal, each of the FGSz's to the VCO, and closing each of the Subscriber Jamming Signal Switches to the subscribers who are not entitled to receive the television signal of channel z, when FGSz is being sent to the VCO, and opening the Jamming Signal Switches of those subscribers who are entitled to receive channel z, when FGSz is being sent to the VCO. Additionally, after a pre-determined period of time the SCC suspends step Jam for a period of time long enough for step Test to be performed, and again performs step Test, and then again suspends step Test and again resumes step Jam, and continues to do so at the pre-determined periods of time.

The apparatus taught by the invention also allows the same jamming signal to be used to jam both the horizontal and the vertical synchronization signals of the channels to be jammed. To accomplish jamming both the horizontal and the vertical synchronization signals, of the channels to be jammed, the SCC performs step Jam as follows: the SCC sends, in continuous rotation, each for durations suitable for jamming the horizontal synchronization signal, each of the FGSz's to the VCO the SCC also, in continuous rotation, on a time shared basis, as determined by the system operator, also sends, each for durations suitable for jamming the vertical synchronization signal, each of the FGSz's to the VCO, and SCC causes the closing of each of the Subscriber Jamming Signal Switches to the subscribers who are not entitled to receive the television signal of channel z, when FGSz is being sent to the VCO, and causes the opening of the Jamming Signal Switches of the subscribers who are entitled to receive channel z, when FGSz is being sent to the VCO.

A preferred method of determining the correct FGSz values, in an apparatus of the invention, is to reduce or increase the JFa by half of the previous amount it was reduced or increased by, (i.e. using a binary convergence method) until the change in JFa is less than I. It is also preferred to store a FGSa, as the FGSz, that resulted in JFa>RFz. Therefore in a more preferred apparatus, the SCC would perform the following Step Test; the SCC begins step "Test" by sending a FGSa to the VCO, causing the VCO to generate JFa; then the SCC sends the appropriate information on the value of D, so that RJFz×D would be the appropriate frequency for jamming channel z, to the Comparison Means. The Comparison Means sends a first signal to the SCC if the comparison resulted in JFa/D>RJFz, and a second signal to the SCC if the comparison resulted in JFa/D<RJFz; if JFa is higher or lower than RJFz×D, then the SCC sends a different FGSa, which is either lower in voltage or higher in voltage, respectively, than the previous FGSa, by an initial amount, to the VCO, causing it to generate a different JFa. Then, when the SCC receives the result of the new comparison from the Comparison Means, if JFa is higher or lower than RJFz, the SCC sends a different FGSa, which is either lower in voltage or higher in voltage, respectively, than the previous FGSa, by half of the previous increase or decrease, to the VCO. The SCC again receives the results of the comparison of JFa/D to RJFz, and the SCC continues to receive the results of the comparison and to send out different FGSa's which are either increased or reduced by half of what the increase or decrease of the previous FGSa was, until: (a) the last increase or decrease in the frequency of JFa was <I, {where "I" is a pre-determined, fixed, frequency value such that (RJFz×D)+I is close enough to RJFz×D, to jam the television signal of channel z if it's amplitude were high enough}, and (b) the second last increase or decrease in the frequency of JFa was <I, and (c) the second last increase or decrease in the frequency of JFa was the opposite of the last increase or decrease in JFa. Additionally, the SCC then stores whichever of the last and second last FGSz's resulted in JFa/D>RJFz, as FGSz, where FGSz is the FGSa that causes the generating means to generate a JFa that will jam channel z. The JFa that will jam channel z is called JFz. Additionally, the SCC continues to operate as stated until there is a stored FGSz for each of the channels to be jammed. Once all of the FGSz's have been stored step Test is ended.

Step Test has two functions. Firstly, it allows the SCC to determine all of the FGSz values, and store them, so that the SCC is able to cause the appropriate jamming frequencies to be generated at the appropriate times. The second purpose of step Test, is that it allows the SCC to periodically re-determine all of the correct FGSz values. Temperature, humidity, and other variables can result in different frequencies being generated from the same FGSz values, after a period of time. Therefore, it is necessary to periodically re-calculate the FGSz values, as after a period of time those values may have to be changed, because what was at one time causing a correct jamming frequency to be generated, at another time could be causing an incorrect jamming frequency to be generated. By periodically performing step Test, the SCC periodically correctly calculates and stores FGSz values, which are correct at the time they are calculated, and should remain correct approximately until step Test is again performed, if the correct time periods have been chosen by the system operator.

Some of the advantages of the method and apparatus taught by the invention are that a very effective jamming of each of the channels to be jammed is achieved, and that only one jamming signal switch may be required per subscriber. Another advantage is that access to the subscriber's home is not needed to allow the subscriber to receive channels that are jammed, and access to the subscriber's home is not needed to deny the subscriber access to channels that are being jammed. Another advantage is that additional subscribers can easily be added to the system as each subscriber need only be connected to the system by one subscriber connection and one jamming signal switch, accordingly, to add on an additional subscriber all that may be needed is to add on to the end of a linear series of subscriber connections and jamming signal switches, one additional subscriber connection and one additional jamming signal switch. Another advantage to the invention is that which channels any subscriber receives can be programmed into the system from the headend, with no need to touch the subscriber's receiver end. Another advantage is that the method of the invention, and an apparatus built according to the method of the invention can jam up to twelve channels. Another advantage is that which of the channels are jammed can be determined at the head-end. The operator merely has to decide which channels are to be jammed, within a certain range, and the SCC determines what the values of D should be. Therefore, if at one time the system is jamming channels 7, 8, 9, 10, 12, 15, 16, 18, 19, 20, 21, and 22, and then at a later time it is desired that the system should not jam channels 12 and 21, that can be programmed into the system from the headend, with no need to touch the receiver ends. If at another time it is desired to no longer jam channels 10, 16, and 20, but to begin jamming channels 13, 14, and 17, that can be programmed into the system from the head-end with no need to touch the receiver ends, and so on. Another advantage to the invention is that it allows the same jamming signal to be used to alternately jam the horizontal and vertical synchronization signals, thereby allowing for a very effective jamming, as not just one but both synchronization signals are being jammed.

BRIEF DESCRIPTION OF THE DRAWINGS

FIG. 5B is a schematic diagram showing the equivalent R.F. circuit of the master switch illustrated in FIG. 4A, when that master switch is on;

DESCRIPTION OF THE PREFERRED EMBODIMENTS

Figure 1:
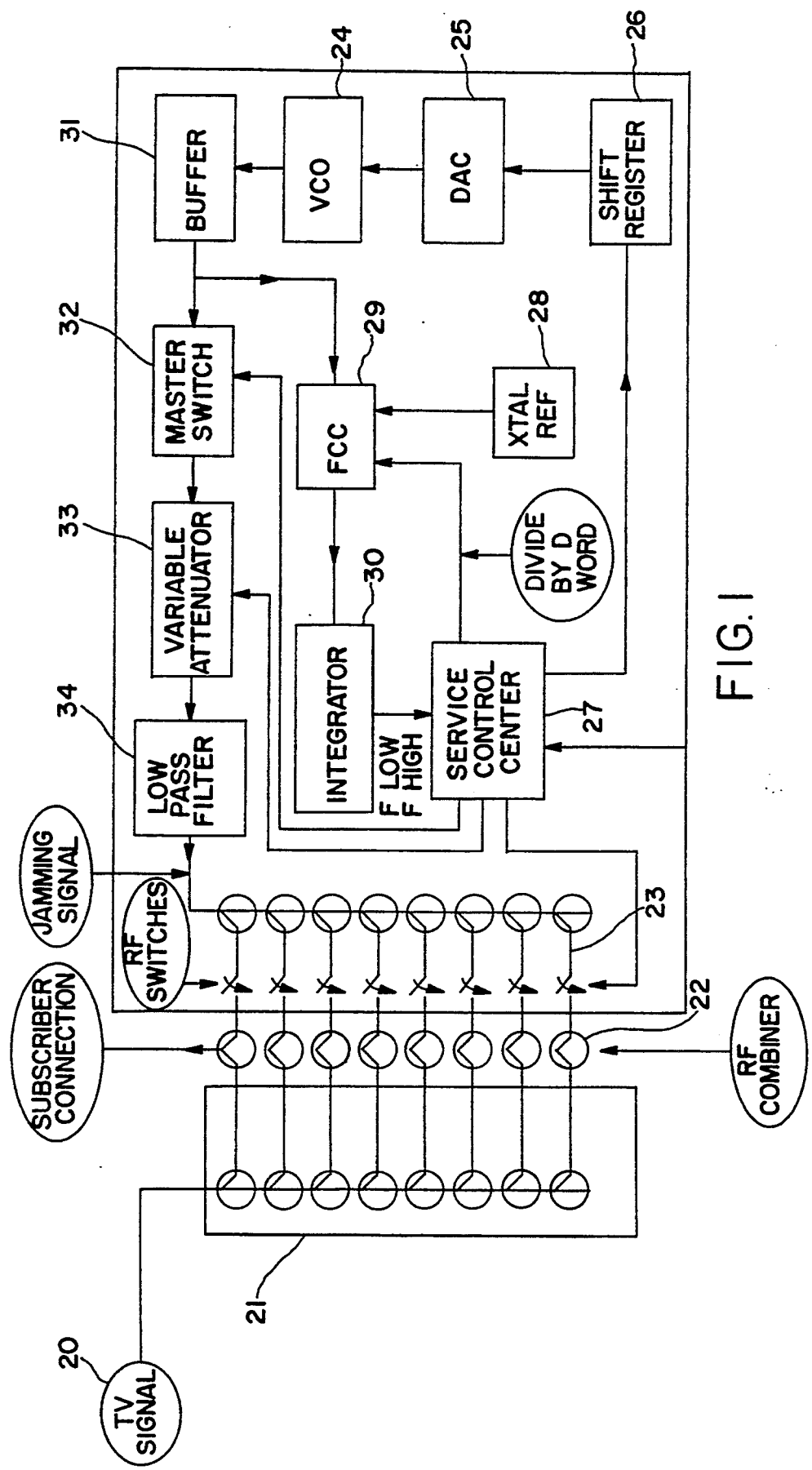
FIG. 1 is a schematic diagram showing a preferred embodiment of an apparatus of the invention.

The preferred embodiment of the method for controlling the reception quality of individual subscribers to CATV, where each of the channels, generally referred to as channel "z", are to be selectively jammed to selected subscribers, is comprised of the following steps. First, selecting and generating a Reference Frequency ("RJFz"), such that where D is a number, RJFz×D would be a jamming signal for channel z. Second, sending an initial Frequency Generation Signal ("FGSa") to a generating means, which causes the generating means to generate a jamming frequency ("JFa") that is similar in frequency to the carrier wave frequency of a typical television channel's signal, and of a duration similar to that of a typical horizontal synchronization signal's duration, and of a slightly greater amplitude. Third, dividing JFa by D and then comparing JFa/D to RJFz, and if JFa/D is higher or lower than RJFz, sending a different FGSa, which is either lower in voltage or higher in voltage, respectively, than the previous FGSa, by an initial amount, to the generating means, causing it to generate a new JFa. Then again comparing the generated JFa/D with RJFz, and if JFa/D is higher or lower than RJFz, sending a new FGSa, which is either lower in voltage or higher in voltage, respectively, than the previous FGSa, by half of the previous amount, to the generating means, causing it to generate a new JFa, which is again divided by D and compared to RJFz, until: (a) the last increase or decrease JFa was <I, {where "I" is a frequency value such that (RJFz×D)+I would jam the television signal for which RJFz is a reference jamming frequency, if the amplitude of (RJFz×D)+I was within the correct parameters}, and (b) the second last increase or decrease in the JFa was <I, and (c) the second last increase or decrease in the JFa was the opposite of the last increase or decrease in JFa. Fourth, storing whichever of the last and second last FGSa's resulted in JFa/D>RJFz, as FGSz. FGSz is the FGSa that causes the generating means to generate a JFa that will jam channel z. The JFa that will jam channel z is called JFz. Fifth, continuing the second, third and fourth steps until there is a stored FGSz for each channel z, and then suspending the second, third and fourth steps. Sixth, where N is the number of television signals being jammed, in continuous rotation, each for durations of approximately 6 to 10 μS, combining JFz with the the television channels signals being transmitted to subscribers who are not entitled to receive the television signal which JFz is jamming. Seventh, where N is the number of channels being jammed, in continuous rotation, once approximately every 15 to 20 mS/N, each for durations of approximately 150 to 300 μS, combining JFz with the television channels signals being transmitted to subscribers who are not entitled to receive the television signal which JFz is jamming. Eighth, during steps six and seven, varying the amplitude of JFz approximately ten times per second by up to 6 db. Ninth, suspending the sixth and seventh steps for a period long enough for the second, third, fourth and fifth steps to be repeated, and then resuming the sixth and seventh step.

The jamming signal being transmitted for duration of between approximately 6 and 10 μS will jam the horizontal synchronization signals of channel z. That same jamming signal, being transmitted for durations of approximately 150 to 300 μS will jam the vertical synchronization signal of channel z. It therefore can be seen that the preferred embodiment of the invention uses the same jamming signal frequency to, at one point, jam the horizontal synchronization signal, by transmitting it in bursts lasting only 6 to 10 μS; and at another point, jam the vertical synchronization signal, by transmitting the JFz in bursts lasting 150 to 300 μS.

The advantage of varying the amplitude of the jamming signal, continuously, a number of times per second, is that it improves the effectiveness of jamming on all television sets. Some television sets have noise filters that could potentially filter out a jamming signal of a fixed amplitude, however, they would, in most cases, not be able to filter out a jamming signal of a varying amplitude.

The preferred embodiment of an apparatus according to the invention is illustrated in FIG. 1. The TV signal 10, which is received by the preferred embodiment carries all of the possible television channels the preferred embodiment is built to jam, and may also carry additional television channels. The preferred embodiment is comprised of: a set of television signal splitter circuits 21; a set of jamming signal switches 23; a set of subscriber signal combiner modules 22; a voltage controlled oscillator ("VCO") 24; a Digital to Analog Converter ("DAC") 25 18; a Shift Register ("SR") 26; a Service Control Center ("SCC") 27; a Quartz crystal reference frequency generating means ("REF") 28; a Frequency Comparator Circuit ("FCC") 29; an Integrator 30; a Buffer 31; a master switch 32; a variable attenuator 33; and a low pass filter 34.

In the preferred embodiment each of the television signal splitter circuits 21 receives the TV signal. The set of jamming signal switches 23 in the preferred embodiment is made up of M (where M is an integer) PIN Diodes RF switches. Each of the jamming signal switches receives the jamming signal. The set of subscriber connections in the preferred embodiment is made up of M signal combiner modules. In the preferred embodiment the signal combiner modules are constructed using splitter circuits. Each subscriber connection connects the signal being put out from that subscriber's television signal splitter circuit and the signal being put out by that subscriber's jamming signal switch. Accordingly, when the subscriber's jamming signal switch is closed whichever channel is being jammed by the jamming signal will be jammed on that subscriber's television set.

The FCC is a circuit that receives two inputted frequencies, one that is constant, and one that varies, it divides the variable inputted frequency by a determined factor, and then compares the divided inputted frequency to the constant inputted frequency and determines which is greater. In the Preferred embodiment the FCC also divides the constant inputted frequency by a factor before making the comparison, however, that is not essential. It is only necessary that the FCC be able to divide the inputted frequency that will vary, by different factors.

In the preferred embodiment the REF puts out a frequency of 4 MHz, within 1 KHz, which is divided in the FCC by 32 to provide a constant reference frequency of 125 KHz. The constant reference frequency used does not have to be 125 KHz. Any suitable constant reference frequency could be used. The suitable reference frequency which the FCC uses will be called "REF". It is not essential that the REF is a frequency that resulted from an initial frequency being divided by a factor before being used by the FCC for comparison. The REF could be a frequency that is used directly by the FCC, in which case it would not be necessary to have the FCC divide the REF by a factor before using it.

The output of the FCC is pulsatory, and could be depicted as a square wave whose duty cycle varies. The Integrator is needed to average the pulsatory output of the FCC and send one of two continuous signals to the SCC; which of the two signals it sends depends on the result of averaging the output of the FCC.

Figure 5A:
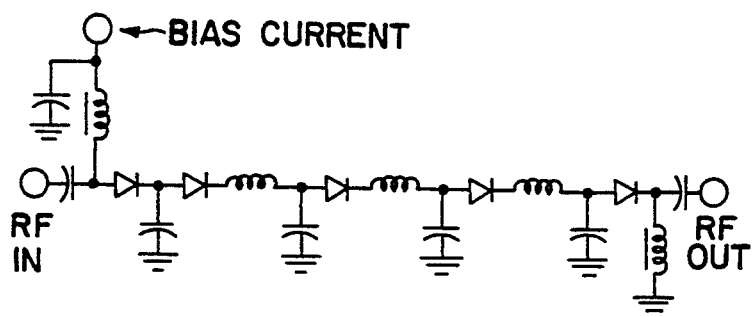
FIG. 5A is a schematic diagram of the master switch of the preferred embodiment of an apparatus according to the present invention.
Figure 5B:
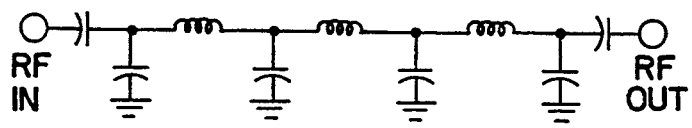
Figure 5C:
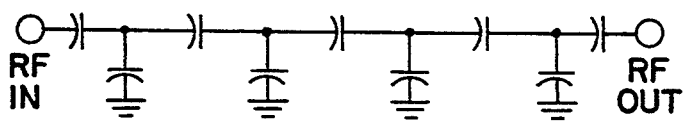
FIG. 5C is a schematic diagram showing the equivalent R.F. circuit of the master switch illustrated in FIG. 4A, when that master switch is off.

FIG. 5A is a schematic diagram of the master switch 32 of the preferred embodiment, which illustrates its construction. The master switch is a PIN diodes RF interruptor that has a controlled rise and fall time to minimize the generation of spurious products during switching. The master switch is made up of the following components: a grounded capacitor connected with an inductor (which is called an "RF Choke"); six additional capacitors; five diodes; and four additional inductors. A first capacitor, which is the input, is followed by a shunt RF Choke, followed by a series first diode, followed by a shunt second capacitor, followed by a series second diode, followed by a series first inductor, followed by a shunt third capacitor, followed by a series third diode, followed by a series second inductor, followed by a shunt fourth capacitor, followed by a series fourth diode, followed by a series third inductor, followed by a shunt fifth capacitor, followed by a series fifth diode, followed by a shunt fourth inductor, followed by a series sixth capacitor, which is the output. When the master switch is on, direct current flows through the diodes and they become conductive; the master switch is then the equivalent of a low pass filter having a cut-off frequency higher than the highest frequency of interest, the schematic diagram of that equivalent circuit is illustrated in FIG. 5B. When the master switch is off the current stops flowing through the PIN diodes and then each diode becomes like a small capacitor; the master switch is then the equivalent of a capacitive ladder attenuator, which equivalent circuit is illustrated in FIG. 5C.

Figure 6:
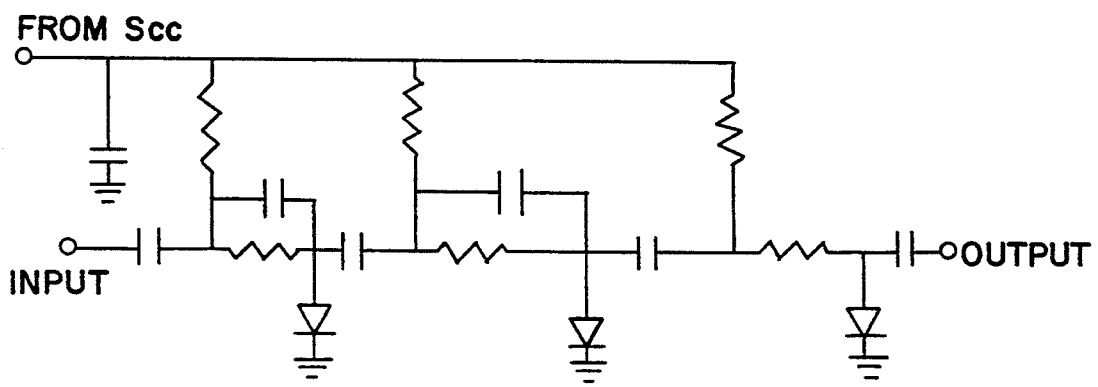
FIG. 6 is a schematic diagram of the variable attenuator of the preferred embodiment of an apparatus according to the present invention.

The Variable Attenuator of the preferred embodiment is illustrated in FIG. 6. It has two purposes, firstly it is used, when necessary, to adjust the amplitude of JFz to a level slightly higher than the amplitude of the signal it is jamming, secondly, it is used to, on instruction from the SCC, continuously make small changes to the amplitude of JFz at the rate of approximately 10 Hz. The Variable Attenuator is made up of the following components: a grounded capacitor, followed by three resistors, six additional capacitors, three additional resistors, and three attenuator type pin diodes. It can be seen from FIG. 6 that the Variable Attenuator circuit used in the preferred embodiment is made up of a first capacitor, followed by a shunt resistor and a resistor and capacitor in parallel, but in series with the signal, followed by a shunt diode, followed by a coupling capacitor, followed by a shunt resistor and a resistor and capacitor in parallel, but in series with the signal, followed by a shunt diode, followed by a coupling capacitor, followed by a series resistor, followed by a shunt diode that is in series with a coupling capacitor. The SCC of the preferred embodiment sends a voltage that will dynamically modify the resistance of the pin diode of the Variable Attenuator, thus giving it continuous range.

The low pass filter 34 of the preferred embodiment is made up of capacitors and inductors. The purpose of the filter is to eliminate the harmonics from the oscillator and master switch circuit.

The buffer 31 prevents feedback from getting to the output end of the VCO when the master switch switches on or off.

The service control center 27 is an electronic control unit. The service control center of the preferred embodiment is made up of a microcontroller with a ROM program, RAM circuits, logic I.C.'s, operational amplifiers and the necessary assorted inputs, outputs and standard circuitry necessary for operation. The service control center, when it first starts operating initializes the system by closing the master switch and opening all switches in the set of jamming signal switches 23. The SCC then begins step "Test" by outputting a digital code that represents a signal ("DCSa") to the SR 26, which the SR outputs to the DAC 25, which converts it into an analog voltage which we will call the frequency generating signal ("FGSa") which it sends to the VCO. The FGSa determines the frequency which is outputted by the VCO, which frequency is referred to as "JFa". The SCC also, based on the information it receives from the head end as to the frequencies of the channels to be jammed, determines, for each channel "z" to be jammed, the value of D that the FCC must divide JFa by, so that if JFa/D=REF, then JFa will jam channel z. The SCC sends the information of what value D should be to the FCC, at the appropriate time. The FCC also receives the JFa from the Buffer 31. The FCC compares JFa/D to REF and sends the result to the Integrator, which sends a first signal to the SCC if the comparison resulted in JFa/D>REF, and a second signal to the SCC if the comparison resulted in JFa/D<REF; if JFa/D is higher or lower than REF, then the SCC sends a different DCSa, which will result in a JFa that is either lower in frequency or higher in frequency, respectively, than the previous JFa, by an initial amount. Then, when the SCC receives the result of the new comparison from the Integrator, if JFa/D is higher or lower than REF, the SCC sends a different DCSa, which will result in a JFa that is either lower in frequency or higher in frequency, respectively, than the previous JFa, by half of the previous increase or decrease. The SCC again receives the results of the comparison of JFa/D to REF, and the SCC continues to receive the results of the comparison and to send out different DCSa's, which will result in JFa's that are either increased or reduced by half of what the increase or decrease of the previous JFa was, until: (a) the last increase or decrease in the frequency of JFa was<I, {where "I" is a frequency value such that JFa+I would jam the same television signal that JFa would jam}, and (b) the second last increase or decrease in the frequency of JFa was<I, and (c) the second last increase or decrease in the frequency of JFa was the opposite of the last increase or decrease in JFa. Additionally, the SCC then stores whichever of the last and second last DCSa's resulted in JFa/D>REF, as DCSz. DCSz is, of course, the DCSz that results in the VCO generating a JFa that will jam channel z. The JFa that will jam channel z is called JFz. The SCC continues to operate as stated until there is a stored DCSz for each of the channels to be jammed. Once all of the DCSz's have been stored step Test is ended. The SCC then suspends the operations of step Test and begins step Jam by, sending, in continuous rotation, each for durations of approximately 6 to 10 μS, each of the DCSz's to the VCO, and closing each of the Subscriber Jamming Signal Switches to the subscribers who are not entitled to receive the television signal of channel z, when DCSz is being sent to the VCO, and opening the Jamming Signal Switches of those subscribers who are entitled to receive channel z, when DCSz is being sent to the VCO. The SCC also, during step Jam, sends, approximately once every 1.2 to 1.7 mS, in continuous rotation, 0.15 to 0.30 mS long pulses of each of the DCSz's to the VCO, and closes each of the Subscriber Jamming Signal Switches to the subscribers who are not entitled to receive the television signal of channel z, when DCSz is being sent to the VCO, and opens the Jamming Signal Switches of those subscribers who are entitled to receive channel z, when DCSz is being sent to the VCO. The SCC, also during step Jam, instructs the Variable Attenuator to vary the amplitude of JFz approximately ten times per second, by up to approximately 6 db. The SCC also, during step Jam, varies the digital code it sends out as DCSz, so that the frequency of JFz varies slightly (preferably within a range of 0 to 800 KHz). The SCC also, after a pre-determined period of time T1 suspends step Jam for a period of time T2, which is long enough for step Test to be performed, and the SCC again performs step Test, and then the SCC again suspends step Test for a period of time T1, and again resumes step Jam for period T2, and continues to alternate between steps Test and Jam, during periods T2 and T1, respectively.

In the preferred embodiment period T1 varies for 5 minutes up to 15 Minutes when the system is warming up, and T1=approximately 60 Minutes after the system has reached its operating temperature. In the preferred embodiment period T2=approximately 1 second. The lengths of time of periods T1 and T2 can, of course, be varied without altering the teachings of the invention.

Figure 2:
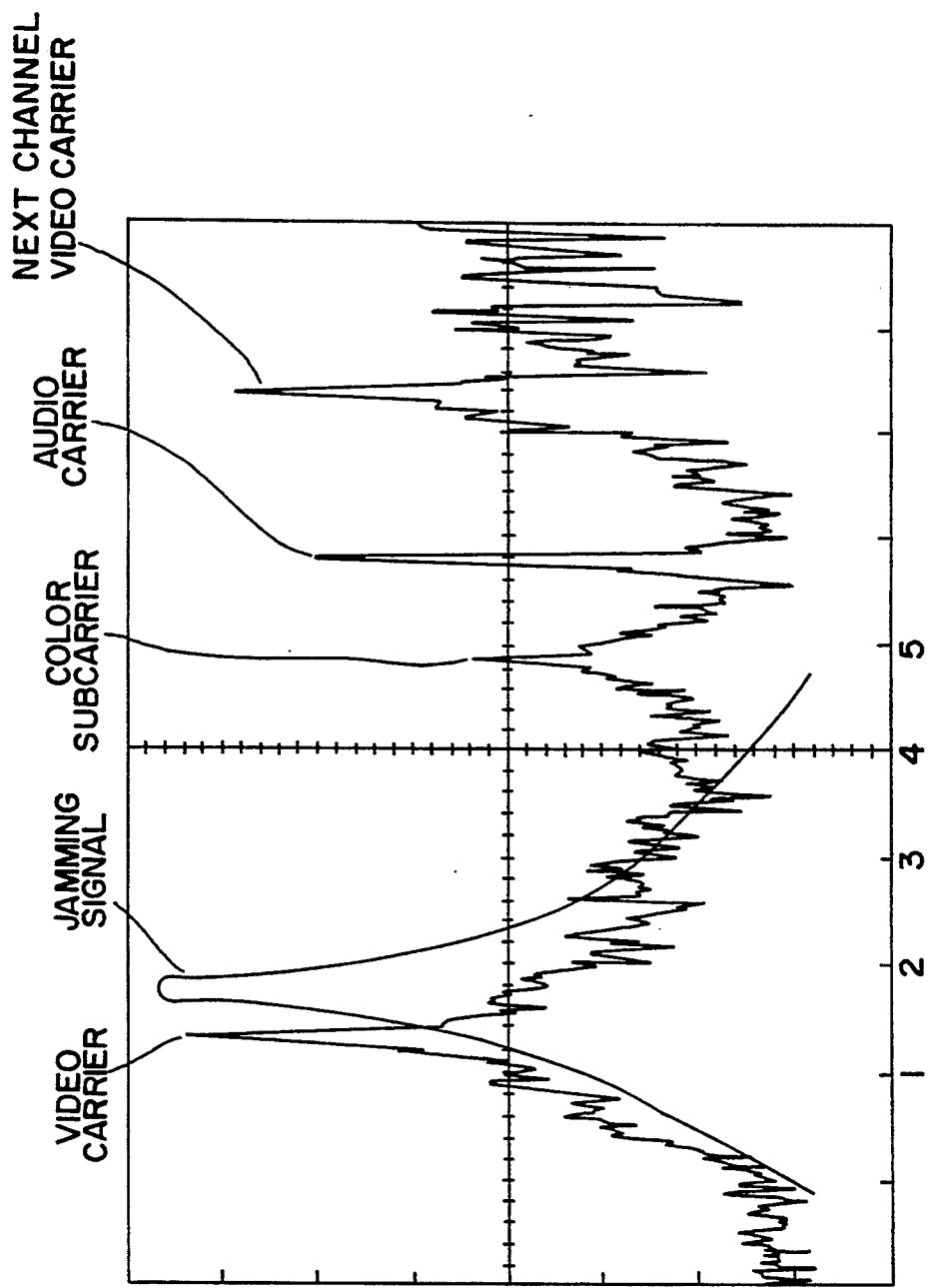
FIG. 2 is an illustration showing the frequency spectrum of a television signal and indicating where the jamming signal of the invention would fall within that frequency spectrum.
Figure 3:
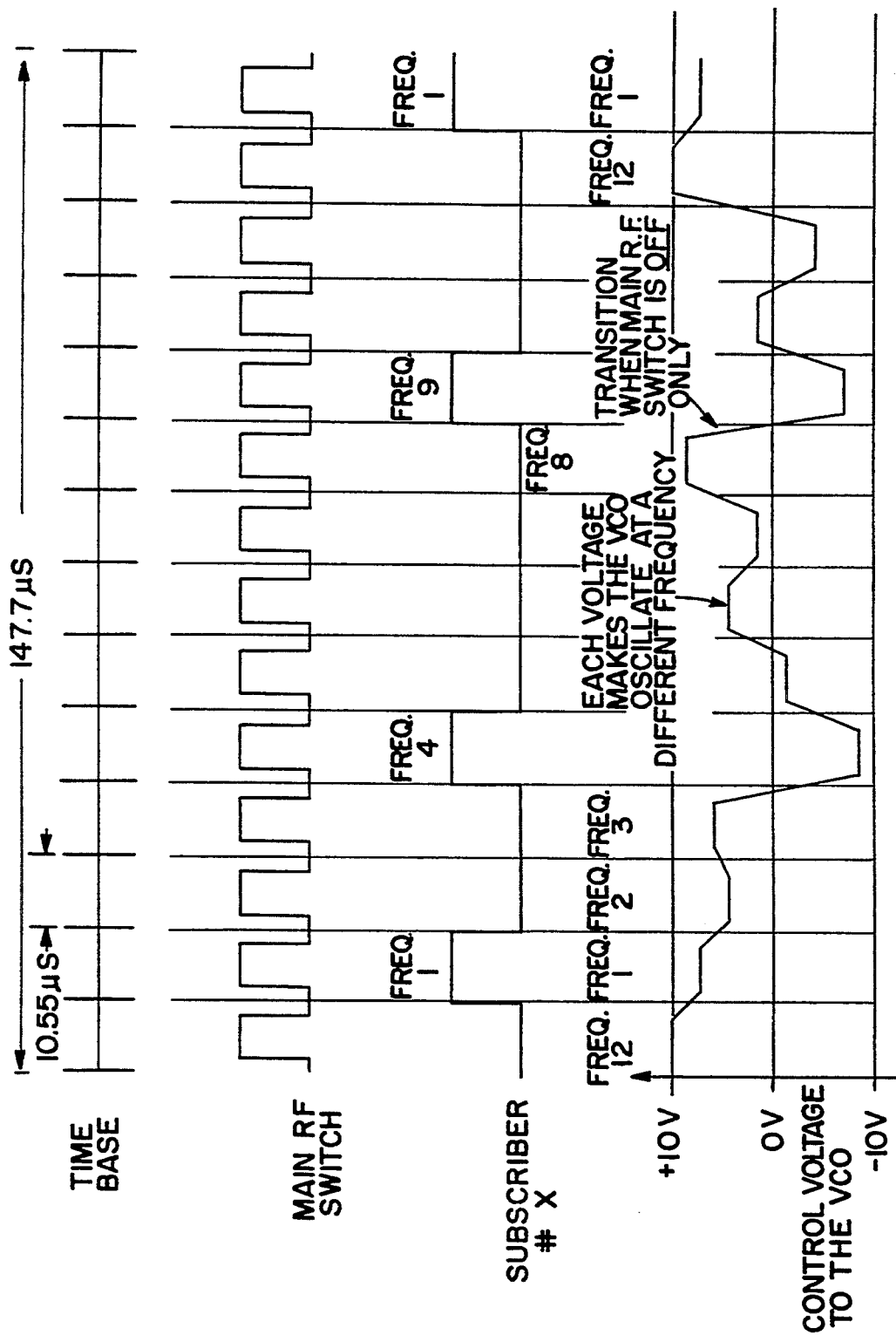
FIG. 3 is a timing diagram illustrating one possible timing scheme for the horizontal jamming pulse of the invention when it has been set up to jam a total of twelve channels, and to jam channels 1, 4, and 9 to subscriber "X"
Figure 4:
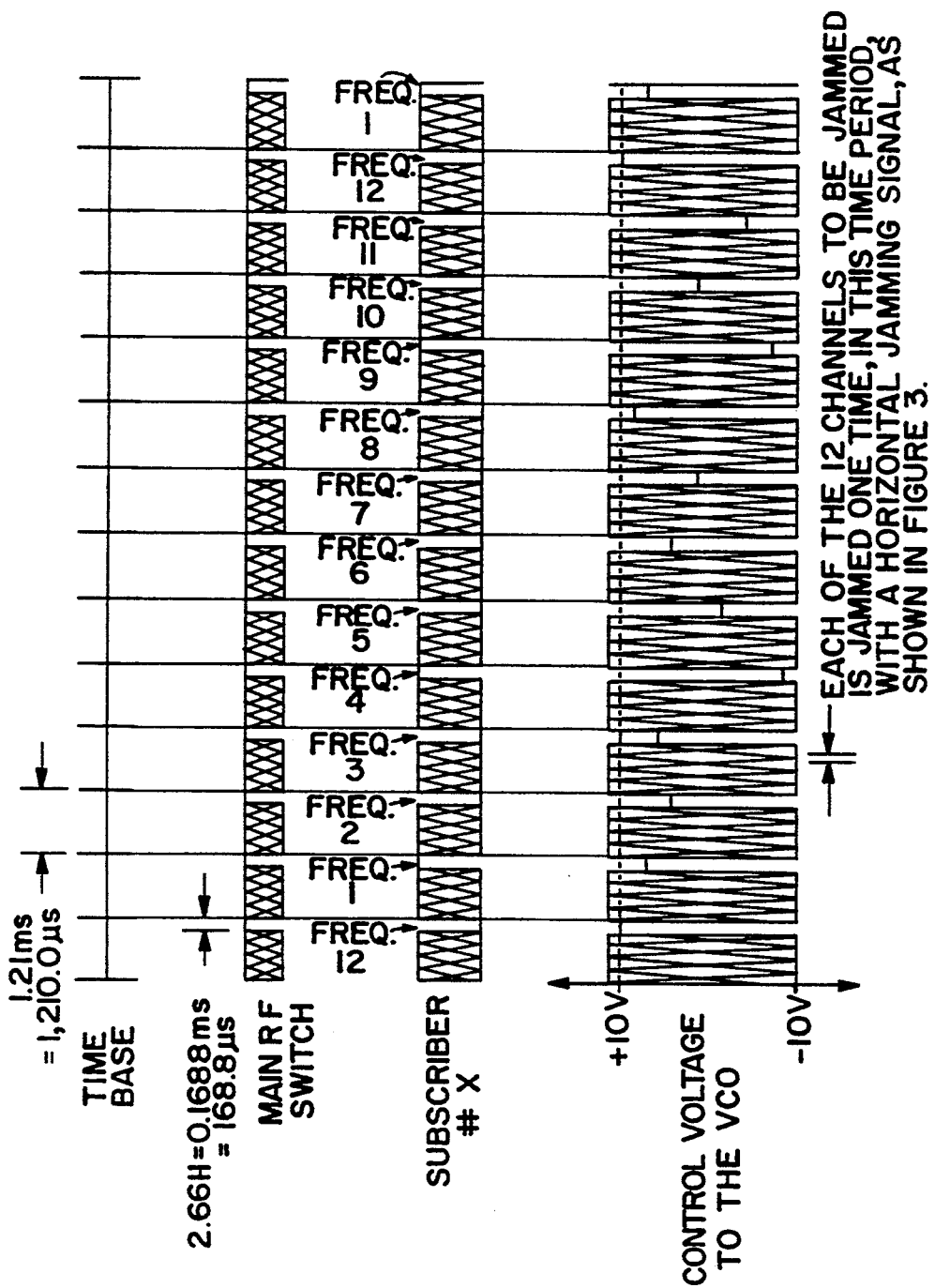
FIG. 4 is a timing diagram illustrating one possible timing scheme for the vertical jamming pulse of the invention when it has been set up to jam the same twelve channels as in FIG. 3, and to jam the same channels 1, 4, and 9 to subscriber "X", as in FIG. 3.

FIG. 2 illustrates a typical television signal frequency spectrum, and where the jamming signal of the invention would appear. The jamming signal of the invention has an amplitude greater than that of the synchronization signal.

The television sets of the subscribers who have had a jamming signal added to their television signals, if tuned to the jammed channel, will therefore lock onto the jamming signal (since it is of a greater amplitude) instead of the proper horizontal synchronization signal, during the 6 to 10 µS pulses, and will have a horizontally unstable picture. During the 0.15 to 0.30 mS pulses the television sets tuned to the jammed channel will lock onto the jamming signal instead of the proper vertical synchronization signal, and will have a vertically unstable picture. The preferred embodiment jams both the horizontal synchronization signal and the vertical synchronization signal of every channel to be jammed, to the appropriate subscribers, many times every second. The preferred embodiment therefore achieves a much more effective jamming than any of the prior art embodiments which only jammed either the vertical synchronization signal or the horizontal synchronization signal, but not both.

In the preferred embodiment a very effective jamming of each of the channels to be jammed is achieved, and only one jamming signal switch is required per subscriber. Additional advantages to the preferred embodiment are also apparent. Access to the subscriber's home is not needed to allow the subscriber to receive channels that are jammed, and access to the subscriber's home is not needed to deny the subscriber access to channels that are being jammed. Subscribers can easily be added to the system as each subscriber need only be connected to the system by one subscriber connection and one jamming signal switch, accordingly, to add on an additional subscriber all that is be needed is to add on to the end of the linear series of subscriber connections and jamming signal switches, one additional subscriber connection and one additional jamming signal switch.

Figure 1A:
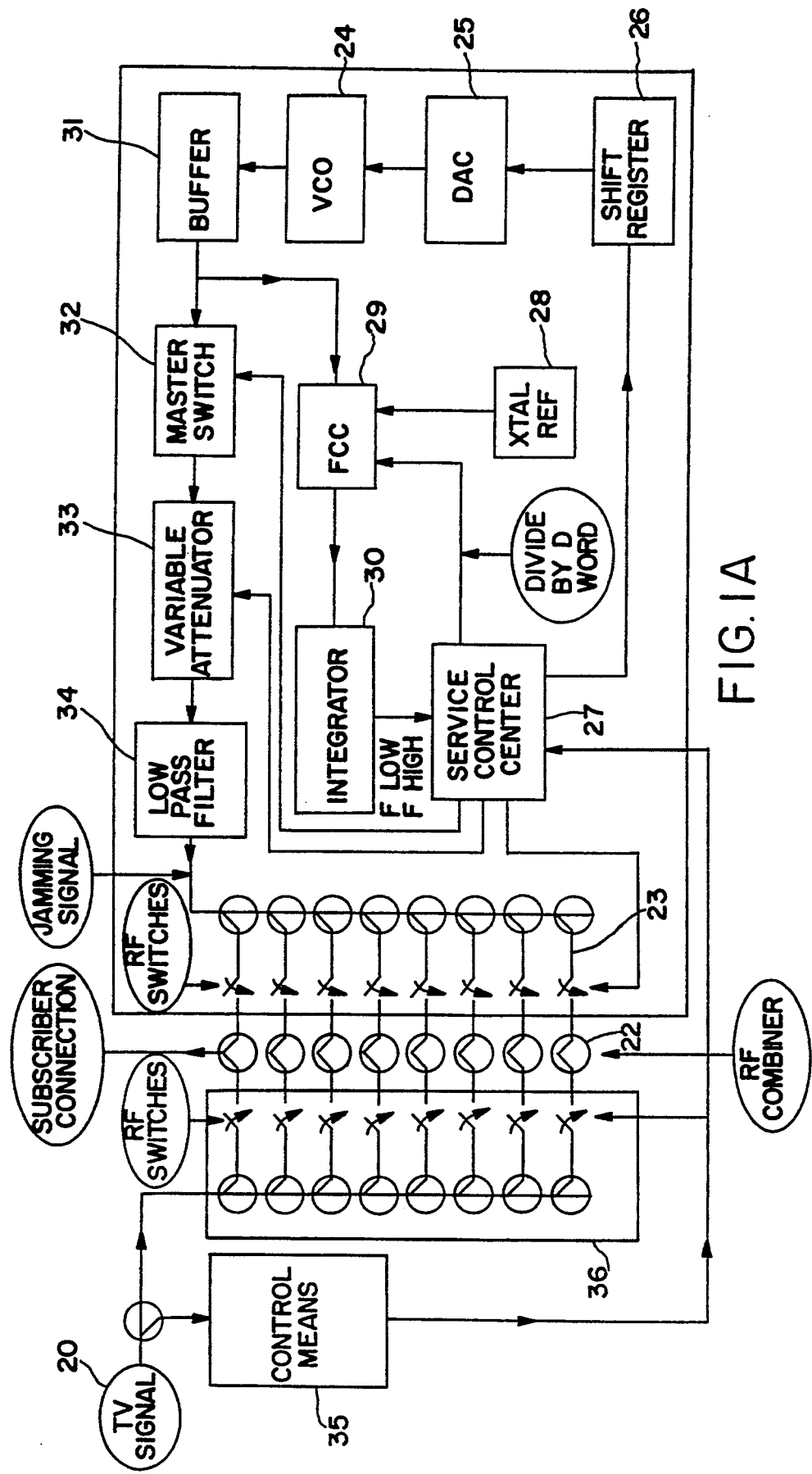
FIG. 1A is a schematic diagram showing a preferred embodiment of an apparatus of the invention working in conjunction with a control means and TV signal switches.

It is anticipated that generally the invention and especially the preferred embodiment of an apparatus of the invention will be used in conjunction with a control means and with TV signal switches instead of television signal splitter circuits. FIG. 1A illustrates the invention working in conjunction with a control means 35 and with TV signal switches 36. In operation the TV signal, has sent along with it, coded information that tells the control means which TV signal switches 36 should be turned on, and which subscribers should have which of their channels jammed. The construction of a control means able to receive coded information telling it which TV signal switches to turn on, and which subscribers should have which of their channels jammed, and able to turn on the appropriate TV signal switches and able to inform the SCC which subscribers should have which of their channels jammed, is well known in the art. TV signal switches is also well known in the art. For example only, they could be PIN Diodes RF switches or RF relay switches.

When the preferred embodiment of an apparatus of the invention is used in conjunction with a control means and with TV signal switches it is very simple for a CATV operator to deny certain channels to certain subscribers from the head end. The CATV operator merely enters the appropriate information into the system at the head end. The information is then transmitted along with the TV signal to the control means, which decodes that information and provides it to the SCC. The SCC then causes the appropriate subscribers' jamming signal switches to close at the appropriate times and the appropriate jamming signals are combined to those subscribers received television signals, thus denying them the appropriate channels.

Variations to the preferred embodiment can easily be made. The signal combiner modules could be constructed using directional couplers instead of splitter circuits as is used in the preferred embodiment. The switches of the set of jamming signal switches, could for example only, be RF Ga As Fet switches instead of PIN Diodes RF switches as are used in the preferred embodiment. The master switch, for example only, instead of being constructed as described for the preferred embodiment, could be constructed using a Ga As Fet RF switch assembly.

Additional variations to the preferred embodiment are also possible, the following are only a few additional examples. The Quartz crystal reference frequency generating means of the preferred embodiment is preferred because Quartz is very stable, and when a circuit passes the correct current through it, it will give out a resonances frequency that is very stable and reliable under temperature and other changes. However, for example only, a coil and capacitor circuit could be used to replace it, as could any type of device or circuit that will generate a reliable frequency.

The Integrator of the preferred embodiment is not essential to the invention. It is only essential that the result obtained by the comparison performed by the FCC be communicated to the SCC, any means of communicating that result to the SCC will allow the invention to function. Similarily, an SCC could output a voltage directly to the VCO, eliminating a need for a Shift Register and a DAC. The preferred embodiment employs a Shift Register and a DAC to allow serial transmission of the information from the SCC, instead of parallel transmission, which would require more output connections from the SCC.

The Variable Attenuator is also not essential to the functioning of the invention, as the invention could function without varying the amplitude of JFz within a range of workable amplitudes. However, the invention would not be as effective, on all television sets, if the amplitude of JFz was not varied, however, it would still be effective enough to perform its function.

Finally, many alternative ways to construct the service control center and some of its components will be clear to those skilled in the art.

Accordingly, many alternatives to the construction of the preferred embodiment, some of which are obvious to those skilled in the art but not specifically stated herein, will be apparent to those skilled in the art. This disclosure is therefore to be understood as illustrative of the invention and not as a limitation of the invention. All such modifications and alternatives which do not depart from the teachings of this invention are intended to be included within the claims.

We claim:

1. A method for controlling the reception of selected television channels by individual subscribers in a cable television, or CATV system, which selected television channels are individually referred to as channel z, wherein channel z has a television channel's signal and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, comprised of the following steps:

(A) selecting and generating a reference frequency for each of the channels "z", which is stable in frequency, wherein the reference frequency is a suitable frequency to jam channel z;

(B) using a generating means to generate a frequency, the amplitude of which, is greater, by a selected amount, than each of the amplitudes of each of the frequencies of each of the carrier waves of each of the television signals of each channel z;

(C) sending a frequency generation signal to the generating means, which causes the generating means to generate a jamming frequency that is similar to the carrier wave frequency of a selected television channel's signal, and of a slightly greater amplitude;

(D) comparing the jamming frequency to the reference frequency, and if the jamming frequency is higher or lower than the reference frequency, sending a different frequency generating signal, which is either lower in voltage or higher in voltage, respectively, than the previous frequency generating signal, by an initial amount, to the generating means, causing it to generate a new jamming frequency, then again comparing the jamming frequency with the reference frequency, and if the jamming frequency is higher or lower than the reference frequency, sending a new frequency generating signal, which is either lower in voltage or higher in voltage, respectively, than the previous frequency generating signal, by less than the previous amount, to the generating means, causing it to generate a new jamming frequency, which is again compared to the reference frequency, until the last increase or decrease in the frequency of the jamming frequency was less than a predetermined frequency value which predetermined frequency value is such that the sum frequency of the reference frequency plus the predetermined frequency value would be a suitable frequency to jam channel z;

(E) remembering the last frequency generating signal, as a channel z frequency generating signal, wherein the channel z frequency generating signal is the frequency generating signal that causes the generating means to generating a jamming frequency that will jam channel z, wherein the jamming frequency that will jam channel z is called a channel z jamming frequency;

(F) performing steps (C), (D), and (E), until there is remembered a channel z frequency generating signal for each channel z, and then suspending steps (C), (D), and (E);

(G) in continuous rotation, each for durations suitable for jamming the horizontal synchronization signal, combining the channel z jamming frequency with the television channels' signals being transmitted to subscribers who are not entitled to receive the television signal which the channel z jamming frequency is jamming; and (H) where "T" is a number to be selected, after every T minutes, suspending step (G) for a period long enough for step (F) to be repeated, repeating step (F), and then resuming step (G).

2. A method for controlling the reception of selected television channels by individual subscribers in a cable television, or CATV system, which selected television channels are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, comprised of the following steps:

(A) selecting and generating a reference frequency for each of the channels "z", which is stable in frequency amplitude, wherein the reference frequency is a suitable frequency to jam channel z;

(B) using a generating means to generate a frequency the amplitude of which is greater by a selected amount, than each of the amplitudes of each of the frequencies of each of the carrier waves of each of the television signals of each channel z;

(C) sending a frequency generation signal to the generating means, which causes the generating means to generate a jamming frequency that corresponds to the carrier wave frequency of a selected television channel's signal, and of a slightly greater amplitude;

(D) comparing the jamming frequency to the reference frequency, and if the jamming frequency is higher or lower than the reference frequency, sending a different frequency generating signal, which is either lower in voltage or higher in voltage, respectively, than the previous frequency generating signal, by an initial amount, to the generating means, causing the generating means to generate a new jamming frequency, then again comparing the jamming frequency with the reference frequency, and if the jamming frequency is higher or lower than the reference frequency, sending a new frequency generating signal, which is either lower in voltage or higher in voltage, respectively, than the previous frequency generating signal, by half of the previous amount, to the generating means, causing it to generate a new jamming frequency, which is again compared to the reference frequency, until:

(i) the last increase or decrease in the frequency of the jamming frequency is less than a fixed predetermined frequency value, such that the sum frequency of the jamming frequency plus the fixed predetermined frequency value would also be a correct frequency to jam channel z, and (ii) the second last increase or decrease in the frequency of the jamming frequency was less than the fixed predetermined frequency value, and (iii) the second last increase or decrease in the frequency of the jamming frequency was the opposite of the last increase or decrease in the jamming frequency;

(E) remembering whichever of the last and second last frequency generating signal's resulted in the jamming frequency being greater than the reference frequency, as a channel z frequency generating signal, wherein the channel z frequency generating signal is the frequency generating signal that causes the generating means to generate a jamming frequency that will jam channel z, wherein the jamming frequency that will jam channel z is called the channel z jamming frequency;

(F) continuing steps (D) and (E), until there is remembered a channel z frequency generating signal for each channel z, and then suspending steps (D) and (E);

(G) In continuous rotation, each for durations suitable for jamming the horizontal synchronization signal, combining the channel z jamming frequency with the television channels' signals being transmitted to subscribers who are not entitled to receive the television signal which the channel z jamming frequency is jamming; and (H) Where "T" is a number to be selected, after every T minutes, suspending step (G) for a period long enough for steps (D) to (F) to be repeated, repeating steps (D) to (F), and then resuming step (G).

3. A method for controlling the reception of selected television channels by individual subscribers in a cable television, or CATV system, which selected television channels are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, as defined in claims 1 or 2, which is further comprised of, during step (G), also in continuous rotation, at predetermined intervals, each for durations suitable for jamming the vertical synchronization signal, combining the channel z jamming frequency with the television channels' signals being transmitted to subscribers who are not entitled to receive the television signal which the channel z jamming frequency is jamming.

4. A method for controlling the reception of selected television channels by individual subscribers in a cable television, or CATV system, which selected television channels are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, as defined in claims 1 or 2, wherein each channel z jamming frequency is stable in both frequency and amplitude.

5. A method for controlling the reception of selected television channels by individual subscribers in a cable television, or CATV system, which selected television channels are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, as defined in claims 1 or 2, which is further comprised of, during step (G), also in continuous rotation, at predetermined intervals, each for durations suitable for jamming the vertical synchronization signal, combining the channel z jamming frequency with the television channels' signals being transmitted to subscribers who are not entitled to receive the television signal which the channel z jamming frequency is jamming; and wherein each channel z jamming frequency is stable in both frequency and amplitude.

6. A method for controlling the reception of selected television channels by individual subscribers in a cable television, or CATV system, which selected television channels are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, as defined in claims 1 or 2, wherein each channel z jamming frequency is stable in both frequency and amplitude, and which is also comprised of, during step (G) periodically varying the frequency of the channel z jamming frequency within a range that will still allow each channel z jamming frequency to be an effective jamming signal.

7. A method for controlling the reception of selected television channels by individual subscribers in a cable television, or CATV system, which selected television channels are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, as defined in claims 1 or 2, which is further comprised of, during step (G), also in continuous rotation, at predetermined intervals, each for durations suitable for jamming the vertical synchronization signal, combining the channel z jamming frequency with the television channels' signals being transmitted to subscribers who are not entitled to receive the television signal which the channel z jamming frequency is jamming; and also, during step (G) periodically varying the frequency of the channel z jamming frequency within a range that will still allow each channel z jamming frequency to be an effective jamming signal.

8. A method for controlling the reception of selected television channels by individual subscribers in a cable television, or CATV system, which selected television channels are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, as defined in claims 1 or 2, wherein each channel z jamming frequency is stable in frequency, and which is also comprised of during step (G) periodically varying the amplitude of the channel z jamming frequency within a range that will still allow each channel z jamming frequency to be an effective jamming signal.

9. A method for controlling the reception of selected television channels by individual subscribers in a cable television, or CATV system, which selected television channels are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, as defined in claims 1 or 2, which is further comprised of, during step (G), also in continuous rotation, at predetermined intervals, each for durations suitable for jamming the vertical synchronization signal, combining the channel z jamming frequency with the television channels' signals being transmitted to subscribers who are not entitled to receive the television signal which the channel z jamming frequency is jamming; and also during step (G) periodically varying the amplitude of the channel z jamming frequency within a range that will still allow each channel z jamming frequency to be an effective jamming signal.

10. A method for controlling the reception of selected television channels by individual subscribers in a cable television, or CATV system, which selected television channels are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, as defined in claims 1 or 2, wherein each channel z jamming frequency is stable in frequency, and which is also comprised of, during step (G), periodically varying the frequency and amplitude of the channel z jamming frequency within ranges that will still allow each channel z jamming frequency to be an effective jamming signal.

11. A method for controlling the reception of selected television channels by individual subscribers in a cable television, or CATV system, which selected television channels are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, as defined in claims 1 or 2, which is further comprised of, during step (G), also in continuous rotation, at predetermined intervals, each for durations suitable for jamming the vertical synchronization signal, combining the channel z jamming frequency with the television channels' signals being transmitted to subscribers who are not entitled to receive the television signal which the channel z jamming frequency is jamming; and also, during step (G) periodically varying the frequency and amplitude of the channel z jamming frequency within ranges that will still allow each channel z jamming frequency to be an effective jamming signal.

12. An apparatus for generating and controlling the application of N jamming signals to individual subscribers' lines in a cable television, or CATV system which is offering at least N channels that are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, comprised of:

(A) a voltage controlled oscillator for generating, one at a time, a number of different frequencies, each of which is generally referred to as a jamming frequency, wherein the amplitude of each jamming frequency, is greater, by a selected amount, than each of the amplitudes of each of the frequencies of each of the carrier waves of each of the television signals of each channel z;

(B) a set of subscriber jamming signal switches, each of which receives the jamming frequency, and each of which will transmit the jamming frequency to the subscriber's line to which that subscriber's jamming signal switch is connected, when that subscriber's jamming signal switch is closed;

(C) a reference frequency generating means that generates a stable reference frequency;

(D) a comparison means that receives the jamming frequency, and that receives the referency frequency, and that can divide the jamming frequency by a dividing factor, wherein the dividing factor is such that when the result of the jamming frequency divided by the dividing factor equals the reference frequency, the jamming frequency is a frequency suitable for jamming channel z, and wherein the comparison means can compare the referency frequency to the result of the jamming frequency divided by the dividing factor, and determine if the referency frequency is greater than or less than the result of the jamming frequency divided by the dividing factor, and which comparison means can output the results of the comparison; and (E) a service control center that receives information from the CATV system on which subscribers are entitled to receive which television signals; and which outputs a frequency generating signal to the voltage controlled oscillator, that determines the frequency of the jamming frequency, and which service control center, based on the information it receives from the CATV system, as to the frequencies of the carrier waves of each of channels z, determines the dividing factor that the comparison means must divide the jamming frequency by, so that if the result of the jamming frequency divided by the dividing factor equals the reference frequency, the jamming frequency will be the appropriate frequency for jamming the television signal of channel z, and which starts the system by beginning the testing by sending a frequency generating signal to the voltage controlled oscillator, causing the voltage controlled oscillator to generate a jamming frequency, and then sending the value of the dividing factor, to the comparison means, and then receiving from the comparison means, a first signal if the comparison resulted in the result of the jamming frequency divided by the dividing factor being greater than the reference frequency, and a second signal if the comparison resulted in the result of the jamming frequency divided by the dividing factor being less than the reference frequency, and if the result of the jamming frequency divided by the dividing factor is higher or lower than the referency frequency, sending a different frequency generating signal, which is either lower in voltage or higher in voltage, respectively, than the previous frequency generating signal, by an initial amount, to the voltage controlled oscillator, causing it to generate a different jamming frequency, then, when the service control center receives the result of the new comparison from the comparison means, if the result of the jamming frequency divided by the dividing factor is higher or lower than the reference frequency, again sending a different frequency generating signal, which is either lower in voltage or higher in voltage, respectively, than the previous frequency generating signal, by less than the previous increase or decrease, to the voltage controlled oscillator, then again receiving the results of the comparison of the result of the jamming frequency divided by the dividing factor being compared to the reference frequency, and continuing to receive the results of the comparison and to send out different frequency generating signals, until the last increase or decrease in the frequency of the jamming frequency was less than a predetermined frequency value, which predetermined frequency value is such that the product of the reference frequency multiplied by the dividing factor, plus the predetermined frequency value, is a correct frequency to jam channel z, and then the service control center stores the last frequency generating signal, as a channel z frequency generating signal, wherein a channel z frequency generating signal is the frequency generating signal that causes the generating means to generate a jamming frequency that will jam channel z, wherein the jamming frequency that will jam channel z is called the channel z jamming frequency, and the service control center continues the above series of operations until there is stored a channel z frequency generating signal for each of the channels to be jammed, and once all of the channel z frequency generating signals have been stored the testing is ended, then the service control center suspends the operation of testing and begins the jamming by sending, in continuous rotation, each for durations of approximately 6 to 10 $\mu$S, each of the channel z frequency generating signals to the voltage controlled oscillator, and closing each of the subscriber jamming signal switches to the subscribers' lines who are not entitled to receive the television signal of channel z, when the channel z jamming frequency is being generated by the voltage controlled oscillator, and opening the Jamming signal switches of those subscribers who are entitled to receive channel z, then, after a pre-determined period of time the service control center suspends the jamming for a period of time long enough for the testing to be performed, and again performs the testing, and then again suspends the testing and again resumes the jamming, and continues to alternate between the testing and the jamming, at predetermined periods of time.

13. An apparatus for generating and controlling the application of N jamming signals to individual subscribers' lines in a cable television, or CATV system which is offering at least N channels that are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, comprised of:

(A) a voltage controlled oscillator for generating, one at a time, a number of different frequencies, each of which is generally referred to as a jamming frequency, wherein the amplitude of each jamming frequency is greater, by a selected amount, than each of the amplitudes of each of the frequencies of each of the carrier waves of each of the television signals of each channel z;

(B) a set of subscriber jamming signal switches, each of which receives the jamming frequency, and each of which will transmit the jamming frequency to the subscriber's line to which that subscriber's jamming signal switch is connected, when that subscriber's jamming signal switch is closed;

(C) a reference frequency generating means that generates a reference frequency, which is stable in frequency;

(D) a comparison means that receives the jamming frequency, and that receives the reference frequency, and that can divide the jamming frequency by a dividing factor, wherein the dividing factor is a factor such that when the result of the jamming frequency divided by the dividing factor equals the reference frequency, the jamming frequency is a frequency suitable for jamming channel z, and wherein the comparison means can compare the reference frequency to the result of the jamming frequency divided by the dividing factor, and determine if the reference frequency is greater than or less than the result of the jamming frequency divided by the dividing factor, and which comparison means can output the results of the comparison; and (E) a service control center that receives information from the CATV system on which subscribers are entitled to receive which television signals; and which outputs a frequency generating signal to the voltage controlled oscillator, that determines the frequency of the jamming frequency, and which, based on the information it receives from the CATV system, as to the frequencies of the carrier waves of each of channels z, determines the value of the dividing factor that the comparison means must divide the jamming frequency by, so that if the result of the jamming frequency divided by the dividing factor equals the reference frequency, the jamming frequency will be the appropriate frequency for jamming the television signal of channel z, and which starts the system by beginning testing by sending a frequency generating signal to the voltage controlled oscillator, causing it to generate a jamming frequency, and then sending the appropriate information on the value of the dividing factor, to the comparison means, and the receiving from the comparison means, a first signal if the comparison resulted in the result of the jamming signal divided by the dividing factor being greater than the reference frequency, and a second signal if the comparison resulted in the result of the jamming signal divided by the dividing factor being less than the reference frequency, and if the result of dividing the jamming frequency by the dividing factor is higher or lower than the reference frequency, sending a different frequency generating signal, which is either lower in voltage or higher in voltage, respectively, than the previous frequency generating signal, by an initial amount, to the voltage controlled oscillator, causing it to generate a different jamming frequency, then, when the service control center receives the result of the new comparison from the comparison means, if the result of the jamming frequency divided by the dividing factor is higher or lower than the reference frequency, again sending a different frequency generating signal, which is either lower in voltage or higher in voltage, respectively, than the previous frequency generating signal, by half of the previous increase or decrease, to the voltage controlled oscillator, then again receiving the results of the comparison of the result of the jamming frequency divided by the dividing factor being compared to the reference frequency, and continuing to receive the results of the comparison and to send out different frequency generating signals, until:

(i) the last increase or decrease in the frequency of the jamming frequency was less than a predetermined frequency value, which predetermined frequency value is such that the product of the reference frequency multiplied by the dividing factor, plus the predetermined frequency value, is a correct frequency to jam channel z, and (ii) the second last increase or decrease in the frequency of the jamming frequency was less than the predetermined frequency value, and (iii) the second last increase or decrease in the frequency of the jamming frequency was the opposite of the last increase or decrease in the jamming frequency, then the service control center stores whichever of the last and second last frequency generating signals resulted in, the result of the jamming frequency divided by the dividing factor being greater than the reference frequency as the channel z frequency generating signal, wherein the channel z frequency generating signal is the frequency generating signal that causes the generating means to generate a jamming frequency that will jam channel z, wherein the jamming frequency that will jam channel z is called the channel z jamming frequency and the service control center continues the above series of operations until there is stored a channel z frequency generating signal for each of the channels to be jammed, and once all of the channel z frequency generating signals have been stored the testing is ended, then the service control center suspends the operations of testing and begins the jamming by sending, in continuous rotation, for durations of approximately 6 to 10 $\mu$S, each of the channel z frequency generating signals to the voltage controlled oscillator, and closing each of the subscriber jamming signal switches to the subscribers' lines who are not entitled to receive the television signal of channel z, when the channel z jamming frequency is being generated by the voltage controlled oscillator, and opening the jamming signal switches of those subscribers who are entitled to receive channel z, then, after a predetermined period of time the service control center suspends the jamming for a period of time long enough for the testing to be performed, and again performs the testing, and then again suspends the testing and again resumes the jamming, and continues to alternate between the testing and the jamming, at predetermined periods of time.

14. An apparatus for generating and controlling the application of N jamming signals to individual subscribers' lines in a cable television, or CATV system which is offering at least N channels that are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, as defined in claims 12 or 13, wherein the service control center additionally, during step Jam, sends out, in continuous rotation, every 15 to 20 mS/N, each for durations of approximately 150 to 300 $\mu$S, each of the channel z frequency generating signals to the voltage controlled oscillator, and closes each of the subscriber jamming signal switches to the subscribers' lines who are not entitled to receive the television signal of channel z, when the channel z jamming frequency is being generated by the voltage controlled oscillator, and opens the jamming signal switches of those subscribers who are entitled to receive channel z.

15. An apparatus for generating and controlling the application of N jamming signals to individual subscribers' lines in a cable television, or CATV system which is offering at least N channels that are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, as defined in claims 12 or 13, wherein the service control center additionally, during step Jam, sends out, in continuous rotation, every 15 to 20 mS/N, each for durations of approximately 150 to 300 μS, each of the channel z frequency generating signals to the voltage controlled oscillator, and closing each of the subscriber jamming signal switches to the subscribers' lines who are not entitled to receive the television signal of channel z, when the channel z jamming frequency is being generated by the voltage controlled oscillator, and opening the jamming signal switches of those subscribers who are entitled to receive channel z, and wherein the service control center, also during the jamming, periodically varies the channel z frequency generating signal so that each channel z jamming frequency varies within acceptable limits a predetermined number of times per second.

16. A method for controlling the reception of selected television channels by individual subscribers in a cable television, or CATV system, which selected television channels are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, comprised of:

(A) Generating a reference frequency;
(B) sending an initial frequency generation signal to a generating means, which causes the generating means to generate a jamming frequency that is stable in frequency and with an amplitude, that is greater, by a selected amount, than each of the amplitudes of each of the frequencies of each of the carrier waves of each of the television signals of each channel z;
(C) dividing the jamming frequency by a dividing factor such that the jamming frequency will have a frequency suitable for jamming channel z when the result of the jamming frequency divided by the dividing factor equals the reference frequency, and then comparing, the result of the jamming frequency divided by the dividing factor to the reference frequency and if the result of the jamming frequency divided by the dividing factor is higher or lower in frequency than the reference frequency sending a different frequency generating signal, which is either lower in voltage or higher in voltage, respectively, than the previous frequency generating signal, by an initial amount, to the generating means, causing it to generate a new jamming frequency, then again comparing the generated jamming frequency, divided the dividing factor by, with the reference frequency, and if the result of dividing the jamming frequency by the dividing factor is higher or lower than the reference frequency, sending a new frequency generating signal, which is either lower in voltage or higher in voltage, respectively, than the previous frequency generating signal, by less than the previous amount, to the generating means, causing it to generate a new jamming frequency, which, divided by the dividing factor, is again compared to the reference frequency, until the last increase or decrease in the frequency of the jamming frequency was less than a predetermined frequency value, which predetermined frequency value is such that if the jamming frequency would jam channel z, then the jamming frequency plus the predetermined frequency value would also jam channel z, and then storing the last frequency generating signal, as a channel z frequency generating signal, wherein the channel z frequency generating signal is the frequency generating signal that causes the generating means to generate a jamming frequency that will jam channel z, wherein the jamming frequency that will jam channel z is called the channel z jamming frequency;

(D) continuing steps (B) and (C) until there is a stored channel z frequency generating signal for each channel z, and then suspending steps (B) and (C);
(E) after step (D), in continuous rotation, each for durations of approximately 6 to 10 μS, combining the channel z jamming frequency with the television channels' signals being transmitted to subscribers who are not entitled to receive the television signal which channel z jamming signal is jamming; and
(F) after each period of T minutes suspending step (E) for a period of time for a period long enough for steps (B), (C), and (D) to be performed, performing said steps, and then resuming step (E).

17. A method for controlling the reception of selected television channels by individual subscribers in a cable television, or CATV system, which selected television channels are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, comprised of the following steps:

(A) generating a reference frequency;
(B) sending a frequency generation signal to a generating means, which causes the generating means to generate a jamming frequency that is stable in frequency, and with an amplitude that is greater by a selected amount than each of the amplitudes of each of the frequencies of each of the carrier waves of each of the television signals of each channel z;
(C) dividing the jamming frequency by a dividing factor having a value such that the jamming frequency will be suitable for jamming channel z when the result of dividing the jamming frequency by the dividing factor equals the reference frequency, and then comparing the result of dividing the jamming frequency by the dividing factor to the reference frequency, and if the result, is higher or lower in frequency than the reference frequency sending a different frequency generation signal, which is either lower in voltage or higher in voltage, respectively, than the previous frequency generation signal, by an initial amount, to the generating means, causing it to generate a new jamming frequency, then again comparing the result of dividing the jamming frequency by the dividing factor, to the reference frequency, and if the result is higher or lower than the reference frequency, sending a new frequency generation signal, which is either lower in voltage or higher in voltage, respectively, than the previous frequency generation signal, by half of the previous amount, to the generating means, causing it to generate a new jamming frequency, and again comparing the result of dividing the jamming frequency by the dividing factor, with the reference frequency, until:

(a) the last increase or decrease in the frequency of the jamming frequency was less than a predetermined frequency value, where the predetermined frequency value was such that if the jamming frequency would jam channel z, then the sum frequency of the jamming frequency plus the predetermined frequency would also jam channel z, and (b) the second last increase or decrease in the frequency of the jamming frequency was less than the predetermined frequency value, and (c) the second last increase or decrease in the frequency of the jamming frequency was the opposite of the last increase or decrease in the jamming frequency, then storing whichever of the last and second last frequency generation signals resulted in the result of dividing the jamming frequency by the dividing factor being greater than the reference frequency, as a channel z frequency generating signal, wherein a channel z frequency generating signal is the frequency generation signal that causes the generating means to generate a jamming frequency that will jam channel z, wherein the jamming frequency that will jam channel z is called the channel z jamming frequency;

(D) continuing step (C) until there is a stored channel z frequency generating signal for each channel z, and then suspending step (C);

(E) after step (D), in continuous rotation, each for durations of approximately 6 to 10 μS, combining the channel z jamming frequency with the television channels' signals being transmitted to subscribers who are not entitled to receive the television signal which the channel z jamming frequency is jamming; and (F) after each period of T minutes suspending step (E) for a period of time long enough for steps (C) and (D) to be performed, performing said steps, and then resuming step (E).

18. A method for controlling the reception of N selected television channels by individual subscribers in a cable television, or CATV system, which channels are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, as defined in claims 16 or 17, which is further comprised of, during step (E), also in continuous rotation, once every 15 to 20 ms/N, each for periods of approximately 150 to 300 μS, combining the channel z jamming frequency with the television channels' signals being transmitted to subscribers who are not entitled to receive the television signal which the channel z jamming frequency is jamming.

19. A method for controlling the reception of N selected television channels by individual subscribers in a cable television, or CATV system, which channels are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, as defined in claims 16 or 17, which is further comprised of, during step (E), also in continuous rotation, once every 15 to 20 mS/N, each for durations of approximately 150 to 300 μS, combining the channel z jamming frequency with the television channels' signals being transmitted to subscribers who are not entitled to receive the television signal which the channel z jamming frequency is jamming, and also during step (E) periodically varying the frequency of the channel z jamming frequency within a range that will still allow each channel z jamming frequency to be an effective jamming signal.

20. A method for controlling the reception of N selected television channels by individual subscribers in a cable television, or CATV system, which channels are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal, and a regularly spaced vertical synchronization signal, as defined in claims 16 or 17, which is further comprised of, during step (E), also in continuous rotation, once every 15 to 20 mS/N, each for durations of approximately 150 to 300 μS, combining the channel z jamming frequency with the television channels' signals being transmitted to subscribers who are not entitled to receive the television signal which the channel z jamming frequency is jamming, and also during step (E), periodically varying the amplitude of the channel z jamming frequency within a range that will still allow each channel z jamming frequency to be an effective jamming signal.

21. A method for controlling the reception of N selected television channels by individual subscribers in a cable television, or CATV system, which channels are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, as defined in claims 16 or 17, which further comprised of, during step (E), also in continuous rotation, once every 15 to 20 mS/N, each for durations of approximately 150 to 300 μS, combining the channel z jamming frequency with the television channels' signals being transmitted to subscribers who are not entitled to receive the television signal which the channel z jamming frequency is jamming, and also during step (E), periodically varying the frequency and amplitude of the channel z jamming frequency within ranges that will still allow each channel z jamming frequency to be an effective jamming signal.

22. A method for controlling the reception of N selected television channels by individual subscribers in a cable television, or CATV system, which channels are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, as defined in claims 16 or 17, which is further comprised of, during step (E), also in continuous rotation, once every 15 to 20 mS/N, each for durations of approximately 150 to 300 µS, combining the channel z jamming frequency with the television channels' signals being transmitted to subscribers who are not entitled to receive the television signal which the channel z jamming frequency is jamming, and also during step (E), periodically varying the frequency and amplitude of the channel z jamming frequency within ranges that will still allow each channel z jamming frequency to be an effective jamming signal, and wherein N=12.

23. An apparatus for controlling the reception of selected television channels by individual subscribers in a cable television, or CATV system, which selected television channels are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, comprised of:

(A) a voltage controlled oscillator for generating, one at a time, a number of different frequencies, each of which is generally referred to as a jamming frequency and each of which is of a greater amplitude, by a selected amount, than each of the amplitudes of each of the frequencies of each of the carrier waves of each of the television signals of each channel z;

(B) a set of subscriber jamming signal switches, each of which receives the jamming frequency, and each of which will transmit the jamming frequency to the subscriber's line to which that subscriber's jamming signal switch is connected, when that subscriber's jamming signal switch is closed;

(C) a Quartz crystal reference frequency generating means that generates a reference frequency, which is stable in frequency;

(D) a frequency comparator circuit that receives the jamming frequency and that receives the reference frequency and can divide the jamming frequency by a dividing factor, wherein when the result of the jamming frequency divided by the dividing factor equals the reference frequency, then the jamming frequency is a correct frequency to jam the horizontal synchronization signal of channel z, and which frequency comparator circuit can compare the result of dividing the jamming frequency by the dividing factor, to the reference frequency and determine if one is greater than the other;

(E) an integrator that receives the result from the frequency comparator circuit and averages it to produce a first signal if the result of dividing the jamming frequency by the dividing factor is greater than the reference frequency, and produces a second signal if the result of dividing the jamming frequency by the dividing factor is less than the reference frequency;

(F) a digital to analog converter which outputs, one at a time, a variety of different analog voltages, in response to digital signals that are inputted to it; and (G) a service control center that receives information from the CATV system on which subscribers are entitled to receive which television signals; and which begins the testing by outputting a digital code that represents a signal to the digital to analog converter, which converts the digital code that represents a signal into an analog frequency generating signal which the digital to analog converter sends to the voltage controlled oscillator, resulting in the voltage controlled oscillator outputting a jamming frequency, then the service control center, based on the information that the service control center receives from the head end as to the frequencies of the channels to be jammed, determines the value of the dividing factor, the service control center then sends the information of what value the dividing factor should be to the frequency comparator circuit, the service control center then receives a first signal from the integrator if the comparison in the frequency comparator circuit determined that the result of the jamming frequency divided by the dividing factor was greater than the reference frequency, and a second signal if the comparison determined that the result of dividing the jamming frequency by the dividing factor was less than the reference frequency, if the result of dividing the jamming frequency by the dividing factor is higher or lower than the reference frequency, the service control center sends a different digital code that represents a signal, which will result in a jamming frequency that is either lower in frequency or higher in frequency, than the previous jamming frequency, by an initial amount, then when the service control center receives the result of the new comparison, if the result of dividing the jamming frequency by the dividing factor is higher or lower than the reference frequency, the service control center sends a different digitial code that represents a signal, which will result in a jamming frequency that is either lower in frequency or higher in frequency, than the previous jamming frequency, by less than the previous increase or decrease, until the last increase or decrease in the frequency of the jamming frequency was less than a predetermined frequency value, such that if the jamming frequency would be a correct frequency to jam channel z, then the sum frequency of the jamming frequency plus the predetermined frequency value would also be a correct frequency to jam channel z, such that if JFz would be a correct frequency to jam channel z, JFa+I would also be a correct frequency to jam channel z], at which time the service control center stores the last digital code that represents a signal, as the channel z digital code wherein the channel z digital code is the digital code that represents a signal that results in the voltage controlled oscillator generating a jamming frequency that will jam channel z, wherein the jamming frequency that will jam channel z is called the channel z jamming frequency, the service control center continues to operate as stated until there is a stored channel z digital code for each of the channels to be jammed, then the service control center suspends the operations of the testing and begins the jamming by sending, in continuous rotation, each for durations of between approximately 6 and 10 μS, each of the channel z digital codes to the voltage controlled oscillator, and closing each of the subscriber jamming signal switches to the subscribers who are not entitled to receive the television signal of channel z, when the channel z digital code is being sent to the voltage controlled oscillator, and opening the jamming signal switches of those subscribers who are entitled to receive channel z, when the channel z digital code is being sent to the voltage controlled oscillator, then after a predetermined period of time T1 the service control center suspends the jamming for a period of time T2, which is long enough for the testing to be performed, and the service control center again performs the testing, and then the service control center again suspends the testing for a period of time T1, and again resumes the jamming for period T2, and continues to alternate between the testing and the jamming, during periods T2 and T1, respectively.

24. An apparatus for controlling the reception of selected television channels by individual subscribers in a cable television, or CATV system, which selected television channels are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, comprised of:

(A) a voltage controlled oscillator for generating, one at a time, a number of different frequencies, each of which is generally referred to as a jamming frequency") and each of which is of a greater amplitude, by a selected amount, than each of the amplitudes of each of the frequencies of each of the carrier waves of each of the television signals of each channel z;

(B) a set of subscriber jamming signal switches, each of which receives the jamming frequency, and each of which will transmit the jamming frequency to the subscriber's line to which that subscriber's jamming signal switch is connected, when that subscriber's jamming signal switch is closed;

(C) a Quartz crystal reference frequency generating means that generates a reference frequency, which is stable in frequency;

(D) a frequency comparator circuit that receives the jamming frequency and that receives the reference frequency and can divide the jamming frequency by a dividing factor, wherein when the result of the jamming frequency divided by the dividing factor equals the reference frequency, then the jamming frequency is a correct frequency to jam the horizontal synchronization signal of channel z, and which frequency comparator circuit can compare the result of the jamming frequency divided by the dividing factor to the reference frequency and determine if one is greater than the other;

(E) an integrator that receives result from the frequency comparator circuit and averages it to produce a first signal if the result of the jamming frequency divided by the dividing factor is greater than the reference frequency, and produces a second signal if the result of the jamming frequency divided by the dividing factor is less than the reference frequency;

(F) a digital to analog converter which outputs, one at a time, a variety of different analog voltages, in response to digital signals that are inputted to it; and (G) a service control center that receives information from the CATV system on which subscribers are entitled to receive which television signals; and which begins the testing by outputting a digital code that represents a signal to the digital to analog converter, which converts it into an analog frequency generating signal ("FGSa") which it sends to the voltage controlled oscillator, resulting in the voltage controlled oscillator outputting a jamming frequency, then the service control center, based on the information it receives from the head end as to the frequencies of the channels to be jammed, determines the value of the dividing factor, the service control center then sends the information of what value the dividing factor should be to the frequency comparator circuit, the service control center then receives a first signal from the integrator if the comparison in the frequency comparator circuit resulted in the result of the jamming frequency divided by the dividing factor being greater than the reference frequency, and a second signal if the comparison resulted in the result of the jamming frequency divided by the dividing factor being less than the reference frequency, if the result of the jamming frequency divided by the dividing factor is higher or lower than the reference frequency, the service control center sends a different digital code that represents a signal, which will result in a jamming frequency that is either lower in frequency or higher in frequency, than the previous jamming frequency, by an initial amount, then when the service control center receives the result of the new comparison, if the result of the jamming frequency divided by the dividing factor is higher or lower than the reference frequency, the service control center sends a different digital code that represents a signal, which will result in a jamming frequency that is either lower in frequency or higher in frequency, than the previous jamming frequency, by half of the previous increase or decrease, until:

(a) the last increase or decrease in the frequency of the jamming frequency was less than a fixed predetermined frequency value, such that if the channel z jamming frequency would be a correct frequency to jam channel z, then the channel z jamming frequency plus the fixed predetermined frequency value would also be a correct frequency to jam channel z; and (b) the second last increase or decrease in the frequency of the jamming frequency was less than the predetermined frequency value, and (c) the second last increase or decrease in the frequency of the jamming frequency was the opposite of the last increase or decrease in the jamming frequency, at which time the service control center stores whichever of the last and second last DCSa's resulted in the result of the jamming frequency divided by the dividing factor being greater than the reference frequency, as, the channel z digital code wherein the channel z digital code is the digital code that represents a signal that results in the voltage controlled oscillator generating a jamming frequency that will jam channel z, wherein the jamming frequency that will jam channel z is called channel z jamming frequency, the service control center continues to operate as stated until there is a stored channel z digital code for each of the channels to be jammed, then the service control center suspends the operations of testing and begins jamming by sending, in continuous rotation, each for durations of between approximately 6 and 10 μS, each of the channel z digital codes to the voltage controlled oscillator, and closing each of the subscriber jamming signal switches to the subscribers who are not entitled to receive the television signal of channel z, when the channel z digital code is being sent to the voltage controlled oscillator, and opening the jamming signal switches of those subscribers who are entitled to receive channel z, when the channel z digital code is being sent to the voltage controlled oscillator, then after a pre-determined period of time T1 the service control center suspends the jamming for a period of time T2, which is long enough for the testing to be performed, and the service control center again performs the testing, and then the service control center again suspends the testing for a period of time T1, and again resumes the jamming for period T2, and continues to alternate between the testing and the jamming, during periods T2 and T1, respectively.

25. An apparatus for generating and controlling the application of 12 jamming signals to individual subscribers' lines in a cable television, or CATV system which is offering at least 12 channels that are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, as defined in claims 23 or 24, wherein the service control center additionally, during step Jam, sends, approximately once every 1.21 to 1.66 ms, in continuous rotation, 0.15 to 0.30 ms long pulses of each of the channel z digital codes to the voltage controlled oscillator, and closes each of the subscriber jamming signal switches to the subscribers who are not entitled to receive the television signal of channel z, when DCSz the channel z digital code is being sent to the voltage controlled oscillator, and opens the jamming signal switches of those subscribers who are entitled to receive channel z, when the channel z digital code is being sent to the voltage controlled oscillator.

26. An apparatus for generating and controlling the application of 12 jamming signals to individual subscribers' lines in a cable television, or CATV system which is offering at least 12 channels that are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, as defined in claims 23 or 24, wherein the service control center additionally, during step Jam, sends, approximately once every 1.21 to 1.66 mS, in continuous rotation, 0.15 to 0.30 mS long pulses of each of the channel z digital codes to the voltage controlled oscillator, and closes each of the subscriber jamming signal switches to the subscribers who are not entitled to receive the television signal of channel z, when the channel z digital code is being sent to the voltage controlled oscillator, and opens the jamming signal switches of those subscribers who are entitled to receive channel z, when the channel z digital code is being sent to the voltage controlled oscillator, and wherein the service control center also, during step Jam, varies the digital code it sends out as the channel z digital code, so that the frequency of the channel z jamming frequency varies slightly a predetermined number of times per second.

27. An apparatus for generating and controlling the application of 12 jamming signals to individual subscribers' lines in a cable television, or CATV system which is offering at least 12 channels that are individually referred to as channel z, wherein channel z has a television channel's signal, and a unique carrier wave onto which the television signal is modulated, which is the carrier wave of that television signal, and which carrier wave has a unique carrier wave frequency, and wherein said television signal has a regularly spaced horizontal synchronization signal and a regularly spaced vertical synchronization signal, as defined in claims 23 or 24, which is further comprised of:

(H) a buffer that receives the channel z jamming frequency from the voltage controlled oscillator;

(I) a baster switch that receives the channel z jamming frequency from the Buffer;

(J) a variable attenuator that receives the channel z jamming frequency from the master switch;

(K) a low pass filter that eliminates harmonics, which receives the channel z jamming frequency from the master switch, and which eliminates any harmonics in the channel z jamming frequency;

(L) wherein the channel z jamming frequency generated by the voltage controlled oscillator is outputted to the buffer, then to the master switch, then to the variable attenuator, then to the low pass filter, and from the low pass filter to the subscriber jamming signal switches; and (M) wherein the service control center additionally, during the jamming, sends, approximately once every 1.21 to 1.66 mS, in continuous rotation, 0.15 to 0.30 mS long pulses of each of the channel z digital codes to the voltage controlled oscillator, and closes each of the subscriber jamming signal switches to the subscribers who are not entitled to receive the television signal of channel z, when the channel z digital code is being sent to the voltage controlled oscillator, and opens the jamming signal switches of those subscribers who are entitled to receive channel z, when the channel z digital code is being sent to the voltage controlled oscillator, and wherein the service control center also, during the jamming, varies the digital code it sends out as DCSz, the channel z digital code so that the frequency of the channel z jamming frequency varies slightly a predetermined number of times per second, and wherein the service control center also, during step Jam, varies the signal it sends to the variable attenuator, so that the variable attenuator slightly varies the amplitude of the channel z jamming frequency a predetermined number of times per second to achieve an even more effective jamming.

* * * * *

UNITED STATES PATENT AND TRADEMARK OFFICE
CERTIFICATE OF CORRECTION

PATENT NO. : 5,396,642

DATED : March 7, 1995

INVENTOR(S) : Pierre Blais, Marc Bourdeault, Mitchell J. Goldberg,

It is certified that error appears in the above-identified patent and that said Letters Patent is hereby corrected as shown below:

In column 2, Line 7, the word channel should read: channels
In column 10, Line 21, delete the number: 18
In column 13, Line 27, delete the word: for; and in its place insert the word: from
In column 23, Line 17, delete the second word: the, and in its place insert the word: then
In column 25, Line 52, after the word: divided, insert the word: by; and delete the word: by, that is at the end of line 52
In column 30, delete lines 53 and 54
In column 30, Line 55, delete the words: frequency to jam channel z]
In column 33, Line 51, delete the word: DCSz
In column 34, Line 31, delete the word: baster, and in its place insert the word: master
In column 34, Line 59, delete the word: DCSz Signed and Sealed this Ninth Day of April, 1996

*Attest:*

BRUCE LEHMAN

*Attesting Officer*  Commissioner of Patents and Trademarks